Oct. 7, 1941.   F. A. GESELL   2,258,448
ORANGE PEELER, SECTIONIZER, AND GRAPEFRUIT PREPARING TOOL
Filed July 9, 1940
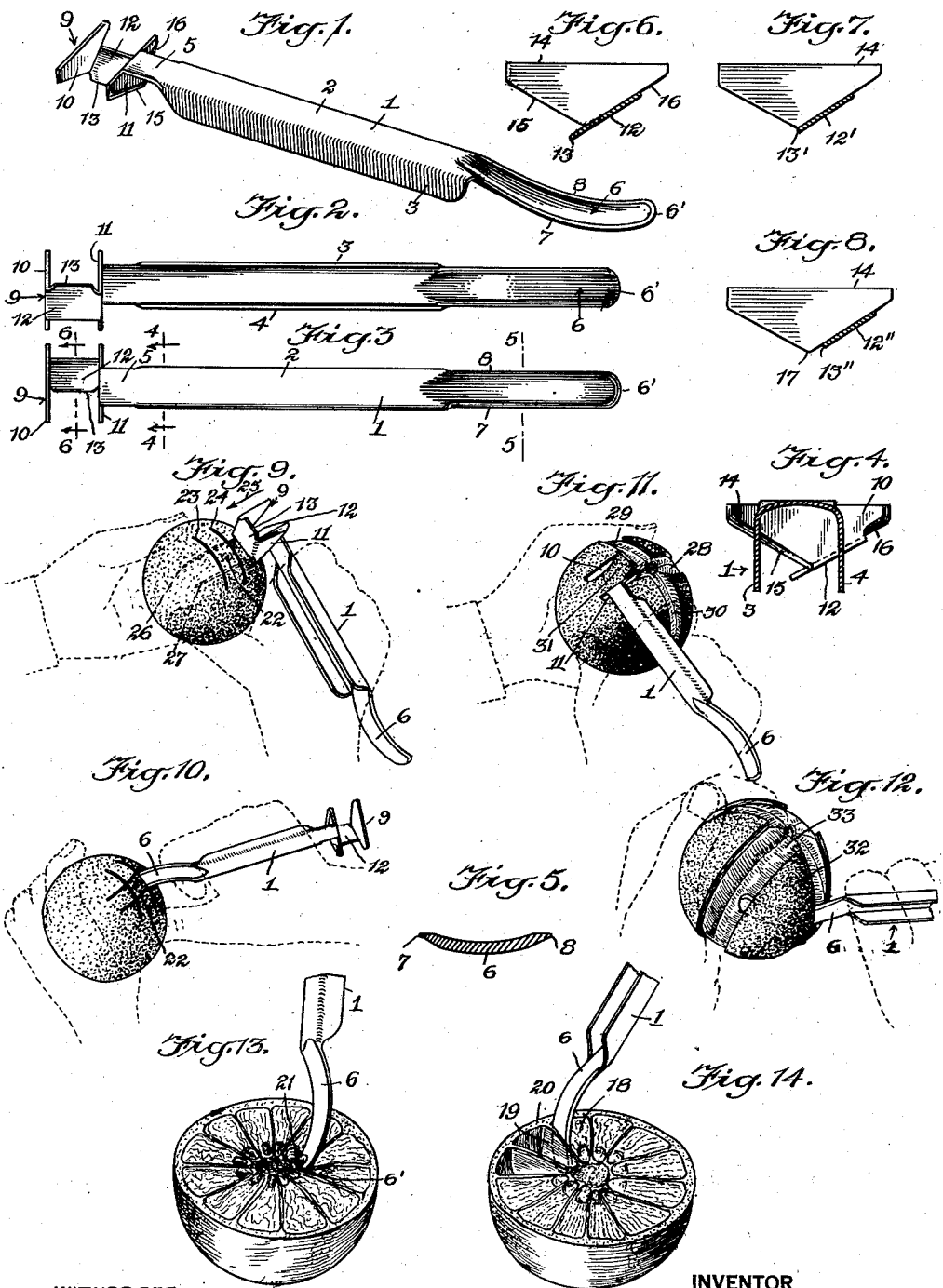
WITNESSES
INVENTOR
Frank A. Gesell
BY
ATTORNEYS Patented Oct. 7, 1941

2,258,448

UNITED STATES PATENT OFFICE 2,258,448

ORANGE PEELER, SECTIONIZER, AND GRAPEFRUIT PREPARING TOOL

Frank A. Gesell, Jersey City, N. J.

Application July 9, 1940, Serial No. 344,468

8 Claims. (Cl. 30—24)

This invention relates to fruit preparing tools and particularly to an improved orange peeler, sectionizer and grapefruit preparing tool, and has for an object to provide a construction which may be used easily and efficiently for peeling and sectionizing oranges and preparing grapefruit ready for serving.

Another object of the invention is to provide a tool for preparing fruit wherein the same may be used to peel spaced strips from oranges and then readily peel the segments from the remaining part of the orange without cutting the membrane containing the juices.

An additional object is to provide a tool which may be used for peeling an orange and for seeding and loosening the pulp of a grapefruit ready for serving.

In the accompanying drawing—

Fig. 1 is a perspective view of a tool disclosing an embodiment of the invention;

Fig. 2 is a bottom plan view of the structure shown in Fig. 1;

Fig. 3 is a top plan view of the structure shown in Fig. 1;

Fig. 4 is a sectional view through Fig. 3 on the line 4—4, the same being on an enlarged scale;

Fig. 5 is a sectional view through Fig. 3 on the line 5—5, the same being on an enlarged scale;

Fig. 6 is a sectional view through Fig. 3 on the line 6—6, the same being on an enlarged scale;

Fig. 7 is a view similar to Fig. 6 but showing a slightly modified construction;

Fig. 8 is a view similar to Fig. 7 but showing a further modified construction;

Fig. 9 is a perspective view of the tool shown in Fig. 1 in position for cutting slits in the end of the peel of an orange ready for removing the end core;

Fig. 10 is a view similar to Fig. 9 but showing the tool removing the end core;

Fig. 11 is a view similar to Fig. 9 but showing the tool used in peeling strips from an orange;

Fig. 12 is a view similar to Fig. 11 but showing the tool for peeling the remaining quadrants of peel from the orange;

Fig. 13 is a perspective view of half a grapefruit illustrating how the tool is used for removing the seeds;

Fig. 14 is a perspective view similar to Fig. 13 but showing the tool disconnecting the pulp from the webs and skin of the grapefruit.

Referring to the accompanying drawing by numeral, 1 indicates the body of a tool embodying the invention, the same also acting as a handle. This body or handle is substantially U-shaped in cross section, as shown in Fig. 4, and is formed with a back 2 and depending sides 3 and 4. The back 2 merges into a flat extension 5 at one end and into an arc-shaped extension 6 at the other end. The extension 6 is a peeler or peeling device adapted to be used as shown in Fig. 12. In addition it is adapted to be used for removing seeds and loosening the pulp of grapefruit as shown in Fig. 14. This peeler or extension 6 is arc-shaped longitudinally and transversely and along each edge there are double-beveled portions 7 and 8 and also a dull edge portion 6' at the end. In preparing oranges or in preparing grapefruit it is not desirable to have a sharp cutting edge but merely a peeling edge, whereby the orange peel may be readily removed without cutting or breaking the thin covering or membrane containing the juices.

At the end opposite the extension or peeler 6, the flat extension 5 merges into a rind cutter and peeler 9. This cutter and peeler consists of a pair of substantially triangular shaped blades or cutting members 10 and 11 which are spaced apart and which are parallel to each other. The cutting member 11 is integral with the extension 5 and has an integral connecting bar 12 which is also integral with the cutter 10. In the construction shown in Figs. 1, 2, 3 and 6 the peeler bar 12 has a dull edge portion 13 which extends beyond the cutting edges of the cutters 10 and 11. It will be observed that the cutters are each provided with a straight base 14 and cutting edges 15 and 16. The cutting edge 16 is comparatively short while the cutting edge 15 extends from the end of the cutter to the peeling bar 12. As a modified form the peeling bar 12 could be arranged as indicated by the numeral 12' in Fig. 7, where the edge 13' is not projecting forward as is true of the preferred form shown in Fig. 6. Also the peeler bar could be arranged as indicated by the numeral 12" in Fig. 8 with the dull edge 13" set back from the apex 17 of the respective cutters 10 and 11.

It will be understood that when the peel is taken off an orange it is peeled and not cut off or pared. Also when the pulp 18 of a grapefruit is to be loosened it is peeled from the respective webs 19 and from the peel 20 of the grapefruit. This is very desirable as it prevents any flavor from the web 19 or the peel 20 entering the pulp 18. The peel 20 usually is more or less bitter and if it is cut the juices will mix with the juices of the pulp 18. By peeling the pulp from the peel 20 this will not occur.

The peeler 6 is intended to peel an orange and also to remove the end core 22, as indicated in Fig. 10, as well as to prepare a grapefruit for serving. The opposite end, namely, the peeler 9, is designed for use in removing the peel of an orange without cutting the membrane surrounding the pulp of the orange.

When an orange is to be peeled the cutting edges 16 of the respective cutters are inserted and cuts or slits 23 and 24 are formed as shown in Fig. 9. It will be observed that these cuts are substantially equal distances on both sides of the end core 22. The instrument is then turned around so as to be positioned substantially as shown in Fig. 9 and is then moved as indicated by the arrow 25, to produce cuts as shown by the dotted lines 26 and 27. When these latter cuts are formed the orange will appear as shown in Fig. 10 and the end 6' of the peeler 6 is used to peel or pry out the core or plug 22. After this has been done the peeler is turned to the position shown in Fig. 11 and moved over the orange toward the opposite end, whereupon a thin strip of the orange peel will be disconnected from the pulp without injuring or cutting the pulp. As shown in Fig. 11, strips have been removed from the portions 28, 29 and 30 so that when the strip 31 is removed the orange will appear substantially as shown in Fig. 12. The peeler 6 is then applied as shown in Fig. 12 to remove the various segments 32 which are left. In the case of an average size orange, four strips 31 may be removed and then the remaining segments 32 removed. If the orange is very large, or if the operator desires, more strips 31 may be removed before using the peeler 6. It will, therefore, be seen that both ends of the tool are used for removing the peel.

The peeler 6 is adapted to to be used for separating the segments of the peeled orange without injuring the membrane holding the juices in place. For instance, after the orange has been peeled the end 6 is inserted in the various division lines 33 near the space occupied by the plug 22 and the segments are moved apart so that the orange becomes sectionized. The separating of the segments may be complete or only partially complete as may be desired.

The tool is adapted to be made of steel or other desired metal and the edges 15 and 16 are adapted to be comparatively sharp while the edges of the bar 12 and the peeler 6 are dull so that the latter edges will produce a peeling action and the first edges will produce a cutting action.

I claim:

1. An orange peeler and sectionizer and grapefruit preparer comprising a body acting as a handle, means on one end of said body consisting of spaced parallel cutters and a peel remover connecting said cutters between the same for cutting and peeling strips of oranges, and an arc-shaped seed remover and stripper at the other end.

2. A device of the character described including a handle and an orange peel cutter and peeler formed with a pair of parallel spaced cutters, each having two sharp cutting edges and a peeling bar connecting the cutters, said peeling bar projecting in advance of the cutters, said advance part having a dull peeling edge.

3. A device of the character described including a substantially U-shaped handle of sheet metal having a substantially flat back with an end portion projecting therefrom, a pair of spaced substantially parallel peel cutters having straight parallel bases in the same plane as said end portions and cutting edges arranged at an angle to the bases, said edges converging at points spaced from the bases and a peeling bar connecting said cutters, each peel cutter being formed substantially triangular in shape with one cutter presenting a right angle extension from said projecting end portion, said peeling bar being integral with the last mentioned peel cutter and extending from one of said cutting edges at right angles to the plane of the cutter, the other of said cutters being integral with the peeling bar but extending at right angles thereto in a plane parallel to the first mentioned cutter.

4. A cutting and peeling device comprising a handle, and means on said handle consisting of spaced parallel cutters, and a peeler connecting said cutters between the same.

5. A cutting and peeling device comprising a handle, and means on one end of said handle consisting of spaced parallel triangular blades each having cutting edges on two of its sides respectively, and a peeler connecting said blades between the same.

6. A cutting and peeling device comprising a handle, and means on one end of said handle consisting of spaced parallel triangular blades each having cutting edges on two of its sides respectively, and a peeler connecting edges of said blades respectively between the same.

7. A cutting and peeling device comprising a handle, and means on one end of said handle consisting of spaced parallel triangular cutting blades extending transversely with respect to the longitudinal axis of the handle, and a peeler blade connecting said cutting blades between the same.

8. A cutting and peeling device comprising a pair of substantially triangular cutting members of flat blade construction and each having cutting edges on two of its sides respectively, a peeler member of flat blade construction rigidly connecting said cutting members in spaced parallel relation and disposed between the same, and a handle having one end thereof rigidly secured to one of said cutting members.

FRANK A. GESELL.